Dec. 8, 1964    D. C. SARCONE    3,159,861
SEWER CLEANING MACHINE
Filed April 8, 1963
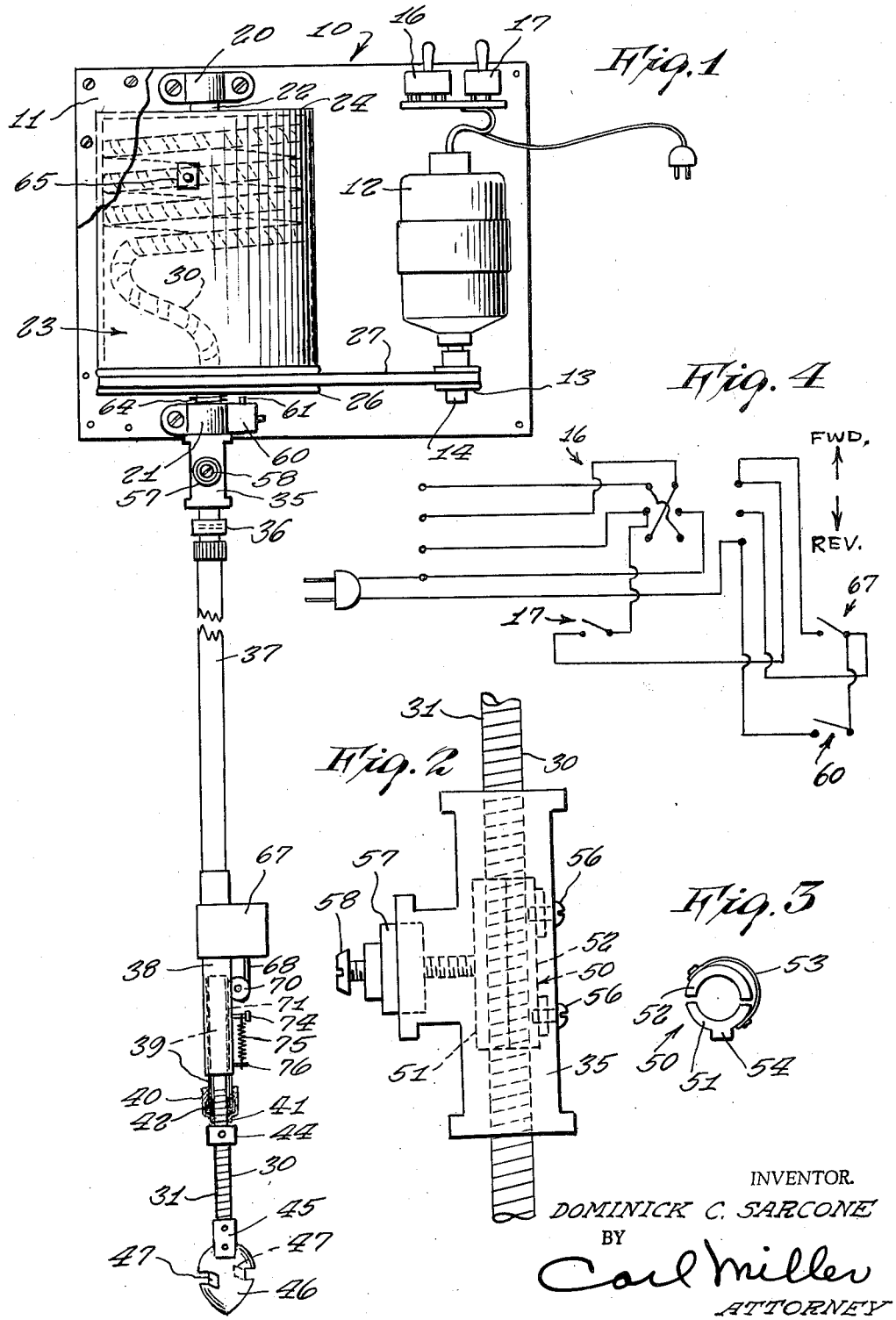
INVENTOR.
DOMINICK C. SARCONE
BY
Carl Miller
ATTORNEY United States Patent Office 3,159,861
Patented Dec. 8, 1964

3,159,861
SEWER CLEANING MACHINE
Dominick C. Sarcone, 3239 Fenton Ave., Bronx, N.Y.
Filed Apr. 8, 1963, Ser. No. 271,108
7 Claims. (Cl. 15—104.3)

This invention relates generally to a sewer cleaning machine.

It is the primary object of this invention to provide in a machine of this type, a reversible motor driven drum containing a length of cable, rotation of the drum causing the cable to feed out of or into the drum by a screw action depending on the direction of drum rotation.

A further object of the invention relates to automatic means operable to stop the motor and rotation of the drum after a predetermined length of cable is fed out, there being provided additional automatic means operable when the motor is reversed to stop the motor and rotation of the drum after the predetermined length of cable is fed back into the drum.

Another object of this invention is to provide a machine of this type which will be sufficiently rigid and powerful to perform the work for which it is designed. That will be compact and self-contained, and which can be efficiently operated in various positions and by a single operator.

The above mentioned objects of the invention, as well as others, together with the advantages thereof, will more fully appear as the following specification proceeds.

In the drawings:

FIGURE 1 is an elevational view showing the sewer cleaning machine with a portion of the cover for the drum and motor housing broken away.

FIGURE 2 is a detail elevational view of the screw feed unit for the cable.

FIGURE 3 is an end view of the adjustable sectional threaded sleeve contained within the screw feed unit.

FIGURE 4 is an electrical diagram of the switch and control circuits employed in the sewer cleaning machine.

Referring to the drawing, 10 denotes a housing having a cover plate 11, in which housing is suitably supported, a reversible electric motor 12 provided with a pulley 13 mounted on motor shaft 14. Conveniently located on the housing 10 is a double-throw triple pole switch 16 and an "on-off" switch 17.

Arranged within the housing 10 on an axis parallel to the axis of the motor 12 are upper and lower stationary bearings 20 and 21. The upper bearing 20 journals for rotative and axial movement, the shaft 22 of a hollow drum 23. The end of the drum 23 opposite the shaft carrying end 24 of the drum is provided with a pulley 26 arranged to be in line with the motor pulley 13, both pulleys being connected by a belt drive 27, the pulley 26 which is rigidly secured in any desired manner to the drum 10 serves also as a removable closure for the drum and is provided with an axial opening through which a cable or "snake" 30 extends.

The cable 30 is formed on its exterior with a threaded surface as at 31, and passes through the lower guide bearing 21. Secured to the housing 10 and co-axial with the guide bearing 21 is a cable screw feed housing 35, closed at both ends except for the entry and exit openings for the cable 30. The screw feed housing 35 is located directly beneath the guide bearing 21. Suitably attached as by the coupling 36 to the lower end of the screw feed housing 35, is a length of flexible plastic hose 37 serving as a handle, through which the cable 30 extends for axial movement. Slidably positioned within a rigid guide sleeve or tube 38, which is appropriately secured to the free end of the plastic hose 37, is a cut-off sleeve 39, the exterior end of which is fitted with a packing sleeve 40. A collar 41 on the packing sleeve 40 slides over the cable 30 that extends through the cut-off sleeve 39. Packing 42 within the packing sleeve acts to prevent the entry of water and dirt as will be readily apparent. Secured on the free end of the cable 30 is a limiting collar 44 for a purpose to be hereinafter described.

On the terminal end of the cable 30, there is fixedly secured as at 45, a cleaning blade 46 provided with opposed cut-out and reversely bent lugs 47. The blade 46 functions to cut out and/or break up the clogging debris in a sewer line. On reverse rotation of the blade 46, rags, etc. will catch on the lugs 47 to be removed as the blade is withdrawn from the sewer line.

Located axially within the screw feed housing 35 is a longitudinally split internally threaded sleeve member 50, comprising two mating sleeve sections 51, 52, held together in normally spaced apart opposed relation by a leaf spring 53, as shown in FIGURE 3. Provided on the sleeve section 51 is a boss 54. The sleeve member 50 is placed in surrounding threaded engagement with the cable 30, and is held in fixed position by means of the screws 56 which engage the sleeve section 52. Provided on one side of the screw feed housing 35 is a grease plug 57, the interior of the screw feed housing being filled with grease to lubricate the cable 30 as it passes through the threaded sleeve member 50. An adjusting screw 58 extends through the grease plug 57 and engages the section 51 to adjust the pressure of the sleeve section 51 on the cable 30 as well as to hold the sleeve sections in assembled relation on the cable 30.

Suitably secured on the lower bearing 21 to be supported thereby is a micro-switch 60 of the type wherein the switch is normally closed, having a switch actuating plunger 61 projecting towards the face of the drum pulley 26. Arranged between the drum pulley 26 and the lower bearing 21 is a compression coil spring 64 disposed in surrounding relation to the cable 30.

The cable 30 is wound within the drum with its inner free end preferably secured to the interior wall of the drum in any desired manner. At a selected point on the cable 30 adjacent its inner free end, a collar 65 is secured thereto, for a purpose to be hereinafter described.

The plastic hose or handle 37 adjacent its free end has mounted thereon a micro-switch 67 on the same type as micro-switch 60, having a switch actuating plunger 68. Provided on the cut-off sleeve 39, at its upper end, is a lug 70 that extends through a longitudinal slot 71 formed in the side of the guide sleeve 38. Also extending through slot 71 is a pin 74 secured to the cut-off sleeve 39 to which one end of a tension spring 75 is fixed, the other end of the spring being connected to a pin 76 secured to the guide sleeve 38 adjacent its free end.

To operate the sewer cleaner, it is first plugged into an electric socket, and the on-and-off switch 17 is in open position, then the cable is placed in the sewer, with the switch 16 in forward position, and then the switch 17 is placed in the closed position. Closing of the double-throw switch 16 into "Forward" will cause the motor to rotate the drum 23 through belt drive 27 in a direction to crank out the cable 30 imparting a torque thereto such as to be moved through the screw feed housing at a uniform speed and advancing the cable 30 outwardly of the drum. With the blade 46 positioned in a clogged sewer drain, the rotating advancing cable 30 will push the blade 46 into the clogged debris cutting and/or breaking it up—and pushing the cut or broken debris forward. When the collar 65 on the cable 30 comes into engagement with the inside face of the pulley 26, it will act to pull the drum 23 towards the stationary bearing 21 against the action of spring 64 until it engages the switch actuating plunger 61 of the micro-switch 60 to open the circuit, as will be clearly apparent from the wiring circuit diagram, see FIGURE 4. This will stop the motor.

Moving the double-throw switch 16 to "Reverse" will advance the cable 30 back into the drum 23, to be rewound therein, and movement of the collar 65 away from the inner face of pulley 26 will permit the spring 64 to raise the drum 23, the micro-switch 60 then returning to its normal closed position as hereinabove described. When the collar 44 engages the end of the cut-off sleeve 39, continued inward movement of the cable 30 will telescope the cut-off sleeve 39 into the guide sleeve 38 until lug 70 engages the switch-actuating plunger 68 of micro-switch 67, to open the circuit and stop the motor as will be clearly apparent from the wiring circuit diagram, FIGURE 4. With the motor stopped, the spring 75 will act on the cut-off sleeve 39 carrying lug 20 to move the cut-off sleeve 39 outwardly of guide sleeve 38, whereby micro-switch 67 will return to its normal closed position. The double-throw switch 16 should then be moved by the operator to its neutral position.

When the machine is inoperative, both switches 16 and 17 are moved to their neutral position.

The machine may be mounted on a suitable support (not shown) for transport.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. A sewer cleaning machine for cleaning out a clogged sewer pipe, comprising a housing, a reversible electric motor supported within said housing, a hollow drum mounted for rotational and axial movement within said housing, drive means connecting said motor and drum, a cable wound within said drum and having its inner end secured thereto, said cable provided with a threaded exterior surface, a screw feed member stationarily mounted on said housing coaxial with the drum axis and adjacent one end of said drum, said cable passing outwardly from said one end of said drum into and through said screw feed member, a flexible tubular handle member connected to said screw feed member, said cable extending through and outwardly of said tubular handle, and a cutting blade fixedly secured to the outer free end of said cable, whereby rotation of said drum in either direction will effect a crank action to said cable within said drum to impart torque thereto such as to cause the cable to advance or retract through the screw feed member and the tubular handle, an electric circuit connected to a source of electric supply, a double-throw-switch in the circuit for controlling the electric motor to operate the same in a "forward" or "reverse" direction in order to respectively wind out and rewind the cable from and into said drum, means fixed to said cable adjacent its inner end engageable with said one end of said drum near the end of its advance therethrough for moving said drum axially, and limit switch means in said electric circuit engageable by said drum in its axial movement automatically operative to open said electric circuit whereby to stop said electric motor in its "forward" drive.

2. The sewer cleaning machine of claim 1, wherein the mounting for said drum comprises a first stationary bearing secured to said housing, a coaxial shaft fixed to the other end of said drum and journaled in said first bearing for rotational and axial movement, a second stationary bearing secured to said housing in co-axially spaced relation to the first mentioned end of said drum, a pulley removably secured to said first mentioned end of said drum, a pulley on said motor and a belt drive connecting said pulleys; said cable passing through an axial opening in said drum pulley and through said second bearing, and a compression coil spring being interposed between said drum pulley and said second bearing and encircling said cable, operative when said electric motor is stopped to return said drum to its normal position by a reverse axial movement thereof.

3. The sewer cleaning machine of claim 2, wherein said means secured to said cable comprises a collar secured to said cable at a selected point from its inner secured end, said limit switch means comprising a first micro-switch of the normally closed type positioned on said housing adjacent said second bearing and having an actuating plunger disposed adjacent said pulley, a like second micro-switch mounted on and adjacent the terminal end of said tubular handle, movable cut-off means positioned on the terminal end of said tubular handle for operating said second micro-switch, both said micro-switches being in appropriate circuit connection with said double-throw switch such that with the motor operative in a "forward" direction, the cable will unwind from within the drum and advance through the screw feed member and tubular handle, said collar on the cable when coming into engagement with the drum pulley face imparting said axial movement to the drum against said compression spring to engage the plunger of the first micro-switch, whereby to open the circuit and stop the motor, the motor then being cut-out of the circuit by manual movement of the double-throw switch to neutral position, the drum being moved back by the compression spring and the first microswitch returning to its normal closed position.

4. The sewer cleaning machine of claim 3, wherein with the motor operative in a "reverse" direction the cable will be rewound within said drum, a collar secured to the cable adjacent its blade carrying end, said collar engaging said cut-off means when said cable is substantially completely retracted to cause said cut-off means to operate the plunger of said second micro-switch, whereby to open the circuit and stop the motor, the motor then being cut-out of the circuit by manual movement of the double-throw switch to neutral position, said cut-out means including spring means for moving the same to inoperative position, the second micro-switch returning to its normal closed position.

5. The sewer cleaning machine of claim 4, wherein said screw feed member comprises a housing fixedly secured to said motor and drum housing exteriorly thereof, an internally threaded split sleeve member within said screw feed housing defining two opposed separate semi-cylindrical sections, leaf spring means joining said sections together at adjacent sides thereof and normally holding the same apart, said sections disposed in surrounding threaded engagement with said cable, fastening elements securing one section to said screw feed housing, a grease plug fitted to said screw feed housing, and an adjusting screw carried by said grease plug and engaging the other section to hold the same against said cable in assembled relation with said first mentioned section.

6. The sewer cleaning machine of claim 5, wherein said cut-out means comprises a rigid guide sleeve at the free end of said flexible tubular member having a slot formed therein, a cut-off sleeve telescoping within said guide sleeve, a lug on said cut-off sleeve extending through said slot, a pin fixed to said cut-off sleeve and extending through said slot, a pin fixed to said guide sleeve, and a tension coil spring connecting said pins whereby to normally hold said cut-off sleeve outwardly extended with relation to said guide sleeve, packing means at the free end of said cut-off sleeve establishing a fluid tight seal with said cable, said collar on said cable adjacent its blade carrying end on retraction of said cable engaging said cut-off sleeve to telescope the same within said guide sleeve, whereby the lug on said cut-off sleeve will engage the plunger of said second micro-switch to operate the same.

7. The sewer cleaning machine of claim 1, and means at the free terminal end of said tubular handle and cable automatically operative to stop the electric motor in its "reverse" drive after the length of advanced cable has been retracted and rewound within said drum.

References Cited in the file of this patent
UNITED STATES PATENTS

| | | |
|---|---|---|
| 2,037,103 | Yohn | Apr. 14, 1936 |
| 2,297,755 | Faust | Oct. 6, 1942 |
| 2,299,785 | Barrett | Oct. 27, 1942 |
| 2,383,843 | Blanc | Aug. 28, 1945 |
| 2,545,063 | Wolfe | Mar. 13, 1951 |
| 2,619,665 | Hopkins et al. | Dec. 2, 1952 |
| 2,828,133 | Silverman | Mar. 25, 1958 |